US011859785B2

(12) United States Patent
Peng et al.

(10) Patent No.: US 11,859,785 B2
(45) **Date of Patent: *Jan. 2, 2024**

(54) LIGHTING APPARATUS

(71) Applicant: XIAMEN LEEDARSON LIGHTING CO.,LTD, Fujian (CN)

(72) Inventors: Wenjin Peng, Fujian (CN); Chunteng Chen, Fujian (CN); Ping Yan, Fujian (CN)

(73) Assignee: XIAMEN LEEDARSON LIGHTING CO.,LTD, Fujian (CN)

( * ) Notice: Subject to any disclaimer, the term of this patent is extended or adjusted under 35 U.S.C. 154(b) by 58 days.

This patent is subject to a terminal disclaimer.

(21) Appl. No.: 17/994,118

(22) Filed: Nov. 25, 2022

(65) Prior Publication Data

US 2023/0091000 A1 Mar. 23, 2023

Related U.S. Application Data

(63) Continuation of application No. 17/320,206, filed on May 13, 2021, now Pat. No. 11,555,585.

(30) Foreign Application Priority Data

Oct. 23, 2020 (CN) ......................... 202022394158.5
Oct. 23, 2020 (CN) ......................... 202022394223.4

(51) Int. Cl.

| | |
|---|---|
| ***F21S 4/28*** | (2016.01) |
| ***F21V 23/06*** | (2006.01) |
| ***F21V 19/00*** | (2006.01) |
| ***F21V 23/00*** | (2015.01) |
| ***F21Y 103/00*** | (2016.01) |

(52) U.S. Cl.
CPC .............. *F21S 4/28* (2016.01); *F21V 19/001* (2013.01); *F21V 23/007* (2013.01); *F21V 23/06* (2013.01); *F21Y 2103/00* (2013.01)

(58) Field of Classification Search
CPC ........ F21S 4/00–28; F21V 19/00–0095; F21V 23/00–06
See application file for complete search history.

(56) References Cited

U.S. PATENT DOCUMENTS

2020/0340633 A1* 10/2020 Chen ....................... F21S 8/061

* cited by examiner

*Primary Examiner* — Jason M Han
(74) *Attorney, Agent, or Firm* — Chun-Ming Shih; LANWAY IPR SERVICES

(57) ABSTRACT

A lighting apparatus includes a driver, an elongated housing, an extending connector, a light source and an extension module. The driver converts an external power source to a driving current. The elongated housing has a lighting area, an extension area and a light opening. The extending connector has a holder and an electrode connecting to the driver. The holder is placed in the extending area of the elongated housing. The light source is attached to the lighting area for generating a first light escaping from the light opening. The extension module is attached to the holder of the extending connector to electrically connect to the driver via the electrode.

18 Claims, 12 Drawing Sheets

LIGHTING APPARATUS

RELATED APPLICATION

The present application is a continued application of U.S. patent application Ser. No. 17/320,206.

FIELD

The present invention is related to a lighting apparatus, and more particularly related to a lighting apparatus with extending functions.

BACKGROUND

The time when the darkness is being lighten up by the light, human have noticed the need of lighting up this planet. Light has become one of the necessities we live with through the day and the night. During the darkness after sunset, there is no natural light, and human have been finding ways to light up the darkness with artificial light. From a torch, candles to the light we have nowadays, the use of light have been changed through decades and the development of lighting continues on.

Early human found the control of fire which is a turning point of the human history. Fire provides light to bright up the darkness that have allowed human activities to continue into the darker and colder hour of the hour after sunset. Fire gives human beings the first form of light and heat to cook food, make tools, have heat to live through cold winter and lighting to see in the dark.

Lighting is now not to be limited just for providing the light we need, but it is also for setting up the mood and atmosphere being created for an area. Proper lighting for an area needs a good combination of daylight conditions and artificial lights. There are many ways to improve lighting in a better cost and energy saving. LED lighting, a solid-state lamp that uses light-emitting diodes as the source of light, is a solution when it comes to energy-efficient lighting. LED lighting provides lower cost, energy saving and longer life span.

The major use of the light emitting diodes is for illumination. The light emitting diodes is recently used in light bulb, light strip or light tube for a longer lifetime and a lower energy consumption of the light. The light emitting diodes shows a new type of illumination which brings more convenience to our lives. Nowadays, light emitting diode light may be often seen in the market with various forms and affordable prices.

After the invention of LEDs, the neon indicator and incandescent lamps are gradually replaced. However, the cost of initial commercial LEDs was extremely high, making them rare to be applied for practical use. Also, LEDs only illuminated red light at early stage. The brightness of the light only could be used as indicator for it was too dark to illuminate an area. Unlike modern LEDs which are bound in transparent plastic cases, LEDs in early stage were packed in metal cases.

In 1878, Thomas Edison tried to make a usable light bulb after experimenting different materials. In November 1879, Edison filed a patent for an electric lamp with a carbon filament and keep testing to find the perfect filament for his light bulb. The highest melting point of any chemical element, tungsten, was known by Edison to be an excellent material for light bulb filaments, but the machinery needed to produce super-fine tungsten wire was not available in the late 19th century. Tungsten is still the primary material used in incandescent bulb filaments today.

Early candles were made in China in about 200 BC from whale fat and rice paper wick. They were made from other materials through time, like tallow, spermaceti, colza oil and beeswax until the discovery of paraffin wax which made production of candles cheap and affordable to everyone. Wick was also improved over time that made from paper, cotton, hemp and flax with different times and ways of burning. Although not a major light source now, candles are still here as decorative items and a light source in emergency situations. They are used for celebrations such as birthdays, religious rituals, for making atmosphere and as a decor.

Illumination has been improved throughout the times. Even now, the lighting device we used today are still being improved. From the illumination of the sun to the time when human can control fire for providing illumination which changed human history, we have been improving the lighting source for a better efficiency and sense. From the invention of candle, gas lamp, electric carbon arc lamp, kerosene lamp, light bulb, fluorescent lamp to LED lamp, the improvement of illumination shows the necessity of light in human lives.

There are various types of lighting apparatuses. When cost and light efficiency of LED have shown great effect compared with traditional lighting devices, people look for even better light output. It is important to recognize factors that can bring more satisfaction and light quality and flexibility.

It is important to add flexibility to light devices. For example, more functions may be added to existing light devices.

Furthermore, it is helpful if the functions can be changed. It is important to add flexibility to light devices. For example, more functions may be added to existing light devices.

Furthermore, it is helpful if the functions can be changed. It is important to add flexibility to light devices. For example, more functions may be added to existing light devices.

Furthermore, it is helpful if the functions can be changed. It is important to add flexibility to light devices. For example, more functions may be added to existing light devices.

Furthermore, it is helpful if the functions can be changed.

SUMMARY

In some embodiments, a lighting apparatus includes a driver, an elongated housing, an extending connector, a light source and an extension module.

The driver converts an external power source to a driving current.

The elongated housing has a lighting area, an extension area and a light opening.

The extending connector has a holder and an electrode connecting to the driver.

The holder is placed in the extending area of the elongated housing.

The light source is attached to the lighting area for generating a first light escaping from the light opening.

The extension module is attached to the holder of the extending connector to electrically connect to the driver via the electrode.

In some embodiments, the extension module is detachable to be replaced with another extension module.

In some embodiments, the holder has a sliding track for inserting the extension module from the light opening.

In some embodiments, the elongated housing has two lateral covers disposed on opposite sides of the elongated housing.

A power wire is connected to one of the lateral cover for transmitting the external power to the driver.

In some embodiments, the elongated housing has two lateral covers disposed on opposite sides of the elongated housing.

A light device connector is disposed on one of the lateral cover to connect to another lighting apparatus for routing electricity to said another lighting apparatus.

In some embodiments, the lighting apparatus may also include a rotation button and a manual switch.

The rotation button and the manual switch are electrically connected to the driver.

The rotation button is used for perform a continuous operation for setting a continuous parameter continuously to operate the driver.

The manual switch provides multiple discrete options for a user to select one of the multiple discrete options to operate the driver.

In some embodiments, the lighting apparatus is connected to a series of other lighting apparatuses.

The lighting apparatus and the series of other lighting apparatuses are configured to receive a wall switch command to adjust a color temperature at the same time.

In some embodiments, the lighting apparatus is connected to another lighting apparatus.

The light source of the lighting apparatus has a first type of light modules and a second type of light modules.

Said another lighting apparatus has the first type of light modules and the second type of light modules.

The first type of light modules and the second type of the light modules of the lighting apparatus and said another lighting apparatus are alternatively turned on periodically to keep a portion of the first type of light modules and the second type of light modules of the lighting apparatus and said another lighting apparatus to rest to control an operation temperature of the lighting apparatus.

In some embodiments, the light source includes a first light part and a second light part.

The first light part and the second light part are disposed on two opposite sides of the extension module.

In some embodiments, the extension module includes an air filter by guiding an air through a filter of the extension module.

In some embodiments, the extension module includes an ultra-violet light module for sanitizing.

In some embodiments, the extension module has a motion sensor to turn off the ultra-violet light module when a person is detected.

In some embodiments, the extension module receives a timer command to turn on the ultra-violet light module after a predetermined time period.

In some embodiments, the lighting apparatus may also include a fan for creating an air flowing by the ultra-violet light module.

In some embodiments, the extension module is a speaker for generating a sound.

In some embodiments, the light source is detachable from the elongated housing.

In some embodiments, the extension module is a spot light module for emitting a second light.

The second light is surrounded by the first light, the second light has a larger intensity than the first light.

In some embodiments, the driver sends a status signal to an external device when the driver detects insertion of the spot light module to change a control interface for controlling the lighting apparatus via a wireless interface.

In some embodiments, a pulling string is selectively attached to a string connector connected to a string switch of the driver to control the light source by pulling the pulling string.

In some embodiments, a button is disposed at an end of the pulling string.

The button is operated to send an instruction to the driver in addition to the pulling of the pulling string.

DETAILED DESCRIPTION

Figure 9:
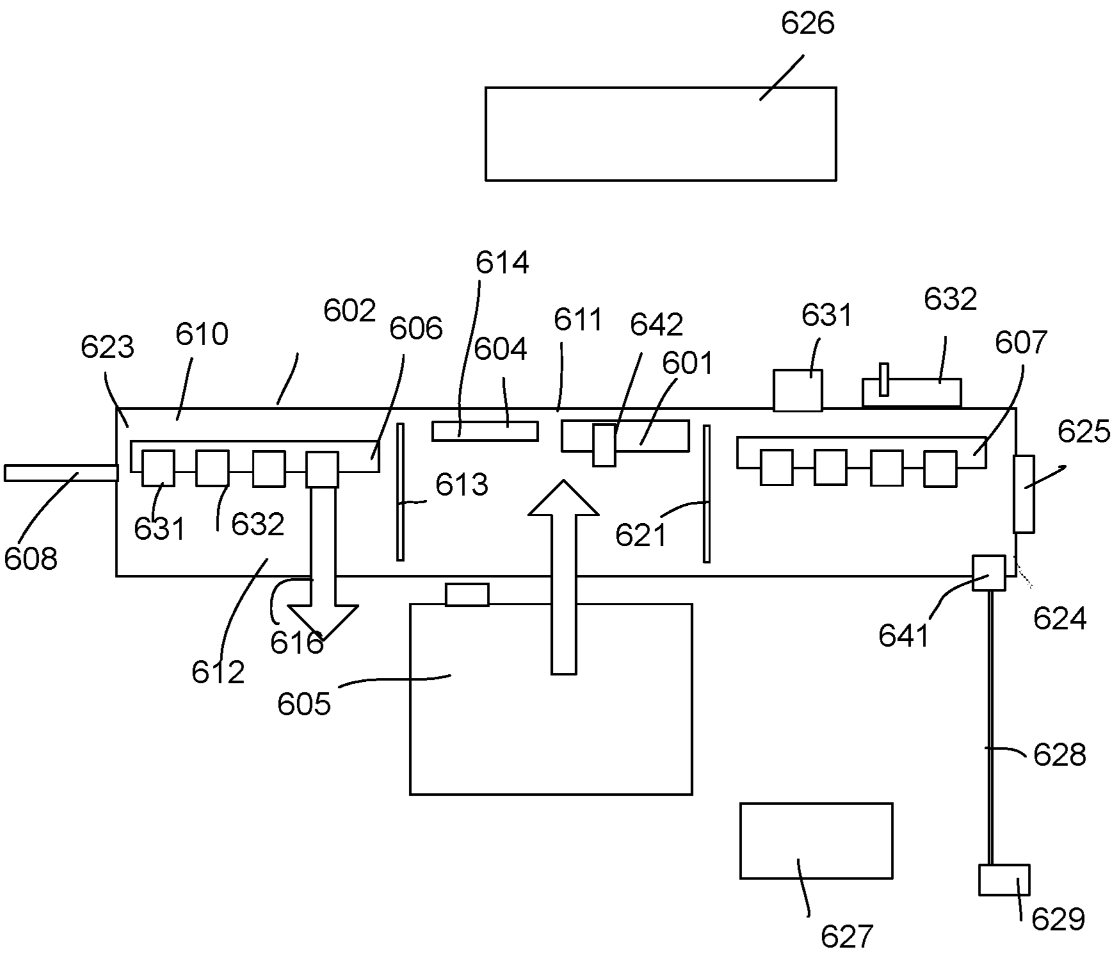
FIG. 9 illustrates a lighting apparatus example.

In FIG. 9, a lighting apparatus includes a driver 601, an elongated housing 602, an extending connector 604, a light source and an extension module 605.

In FIG. 9, the light source is composed a first light part 606 and a second light part 607. In some other embodiments, the light source may have one or more than three parts.

The driver 601 converts an external power source to a driving current. For example, a power wire 607 guides an indoor power source of 110V alternating current power to the driver 601. The driver 601 includes a transformer, a rectifying circuit, filter circuits or other components to convert the alternating current power to a direct current power supplied to the light source and the extension module.

In some embodiments, the extension module may carry a battery to be charged in normal time and supplying power to the light source when the external power is not available abnormally.

The elongated housing has a lighting area 610, an extension area 611 and a light opening 612.

The extending connector has a holder 613 and an electrode 614 connecting to the driver 601. For example, the holder 613 may include a box for inserting the extension module. The electrode 614 is disposed inside the box so that when the extension module is inserted, the extension module is electrically connected to the driver 601 via the electrode 614.

The holder 613 is placed in the extending area 611 of the elongated housing 602.

The light source is attached to the lighting area 610 for generating a first light 616 escaping from the light opening 612.

The extension module 605 is attached to the holder 613 of the extending connector to electrically connect to the driver 601 via the electrode 614.

In some embodiments, the extension module is detachable to be replaced with another extension module. For example, users may buy several extension modules with the same housing but with different functions to be inserted into the holder 613 of the extending connector 604. A first extension module may be a speaker and a second extension module may be a wireless module to provide wireless connectivity to the driver 601.

The extension module may be a camera module, a sensor module, a Wi-Fi hotspot device or other function modules.

In some embodiments, the holder has a sliding track 621 for inserting the extension module 605 from the direction of the light opening 612, e.g. the bottom side of the elongated housing 602.

In some embodiments, the elongated housing 602 has two lateral covers 623, 624 disposed on opposite sides of the elongated housing 602.

A power wire 608 is connected to one of the lateral cover for transmitting the external power to the driver 601.

In some embodiments, the elongated housing has two lateral covers disposed on opposite sides of the elongated housing.

A light device connector 625 is disposed on one of the lateral cover to connect to another lighting apparatus 626 for routing electricity to said another lighting apparatus 626.

Said another lighting apparatus may have the same structure as the lighting apparatus. In some usage examples, the two lighting apparatuses may be the same but are installed with different extension modules, e.g. one for a camera and another for a spot light.

In some embodiments, the lighting apparatus may also include a rotation button 631 and a manual switch 632.

The rotation button and the manual switch are electrically connected to the driver.

The rotation button is used for perform a continuous operation for setting a continuous parameter continuously to operate the driver.

Specifically, the continuous operation refers to a continuous parameter range. For example, a light intensity from 200 intensity units to 1000 intensity units is a parameter range. When the light intensity is selected by rotating the rotation button, the value may be selected like 250.002323 or 250.21235, which falls in the range but has unlimited options, which is called continuous.

In contrast, the manual switch provides a limited set of options to be selected, which is called discrete options.

The manual switch provides multiple discrete options for a user to select one of the multiple discrete options to operate the driver.

The manual switch and the rotation button may be used for controlling the same type of parameters, e.g. intensity or different types of parameters, e.g. the rotation button for intensity adjustment while the manual switch is used for indicating a required color temperature. The manual switch may be configured to co-work with the rotation button. For example, the manual switch determines a parameter type and the rotation button determines a specific value of the parameter type.

Figure 10:
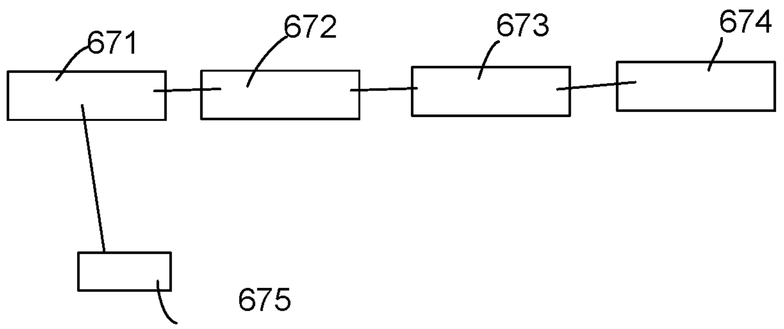
FIG. 10 illustrates multiple lighting apparatuses connected in series.

In FIG. 10, the lighting apparatus 671 is connected to a series of other lighting apparatuses 672, 673, 674.

The lighting apparatus and the series of other lighting apparatuses are configured to receive a wall switch command from a wall switch 675 to adjust a color temperature at the same time. The control signal may be transmitted to the lighting apparatus 671 first, and the lighting apparatus 671 routes or translates the control signal to supply to other lighting apparatuses 672, 673, 674.

In some embodiments, the lighting apparatus is connected to another lighting apparatus.

The light source of the lighting apparatus has a first type of light modules and a second type of light modules. For example, in FIG. 9, the first light part has a first type of light modules 631 and a second type of light modules 632. Specifically, the first type of light modules 631 may emit light of a first color temperature and the second type of light modules 632 may emit light of a second color temperature.

Said another lighting apparatus has the first type of light modules and the second type of light modules. Said another lighting apparatus may have the same structure as the lighting apparatus illustrated and explained above in FIG. 9.

The first type of light modules and the second type of the light modules of the lighting apparatus and said another lighting apparatus are alternatively turned on periodically to keep a portion of the first type of light modules and the second type of light modules of the lighting apparatus and said another lighting apparatus to rest to control an operation temperature of the lighting apparatus.

For example, if two lighting apparatuses are placed together, and the two lighting apparatuses have the same structures. To mix a required color temperature, in a first time period, the first set of light modules of a first lighting apparatus is turned on to accompany the second set of light modules of a second lighting apparatus. In a second time period, the first set of light modules of the first lighting apparatus is turned on. The second type of light modules are turned on in the first lighting apparatus to accompany the first type of light modules in the second lighting apparatus to mix the required color temperature.

In other words, some portion of light modules are rest even the required color temperature is continuously provided. Such design increase life span of the overall light devices and provide a nice heat dissipation scheme.

In some embodiments, the light source includes a first light part and a second light part.

The first light part and the second light part are disposed on two opposite sides of the extension module, as illustrated in FIG. 9.

Figure 11:
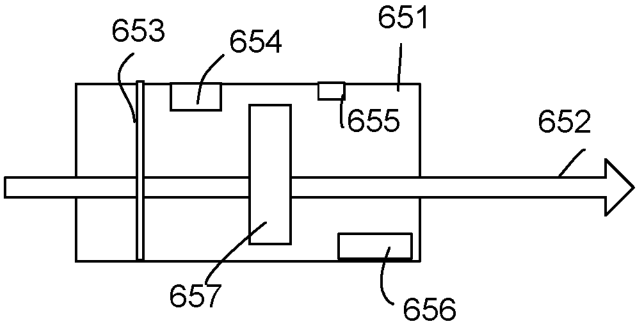
FIG. 11 illustrates an extension module example.

In FIG. 11, the extension module includes an air filter by guiding an air through a filter 653 of the extension module.

In some embodiments, the extension module includes an ultra-violet light module 654 for sanitizing. The ultra-violet module emits an ultra-violet light to kill undesired objects. Some ultra-violet light does not cause harm to human and may be placed outside while some other ultra-violet light may cause danger to human and is therefore disposed in a concealed space for sanitizing air flowing by.

In some embodiments, the extension module has a motion sensor 656 to turn off the ultra-violet light module when a person is detected.

In some embodiments, the extension module receives a timer command to turn on the ultra-violet light module after a predetermined time period. For example, a timer 655 is used to determine a timing to activate the sanitizing, e.g. when people leave the store or home and the sanitizing is started one hour later after the setting.

In some embodiments, the lighting apparatus may also include a fan 657 for creating an air 652 flowing by the ultra-violet light module 654.

In some embodiments, the extension module is a speaker for generating a sound.

In some embodiments, the light source is detachable from the elongated housing.

In some embodiments, the extension module is a spot light module for emitting a second light.

Figure 12:
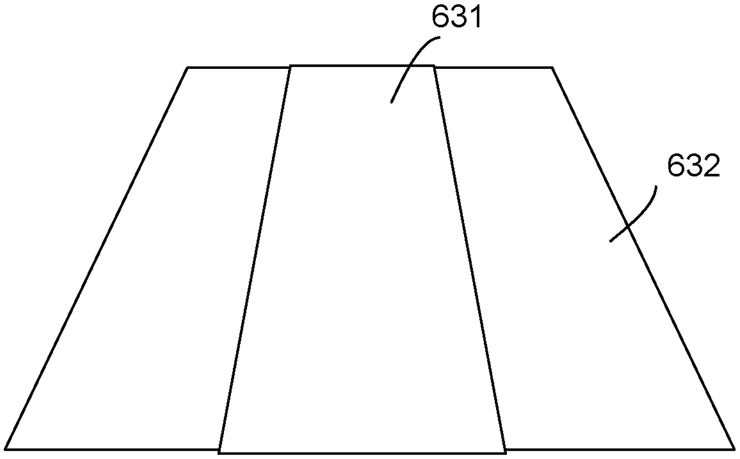
FIG. 12 illustrates a combined light pattern.

Please see FIG. 12, which shows an example of configuration. The second light 631 is surrounded by the first light 632, and the second light 631 has a larger intensity than the first light 632.

In FIG. 9, the driver sends a status signal to an external device 626 when the driver detects insertion of the spot light module to change a control interface for controlling the lighting apparatus via a wireless interface.

For example, the external device is a remote control or a mobile phone installed with a corresponding App. The corresponding App adjusts a control interface by determining the status signal indicating the type of the extension module.

For example, when the extension module is a speaker, the interface is different from the case which the extension module is a spot light module.

In some embodiments, a pulling string 628 is selectively attached to a string connector 641 connected to a string switch 642 of the driver 601 to control the light source by pulling the pulling string 628.

In some embodiments, a button 629 is disposed at an end of the pulling string 628.

The button 629 is operated to send an instruction to the driver 601 in addition to the pulling of the pulling string 628. For example, the button 629 may switch an operation mode, control the extension module or change a color temperature of the light source.

Figure 1:
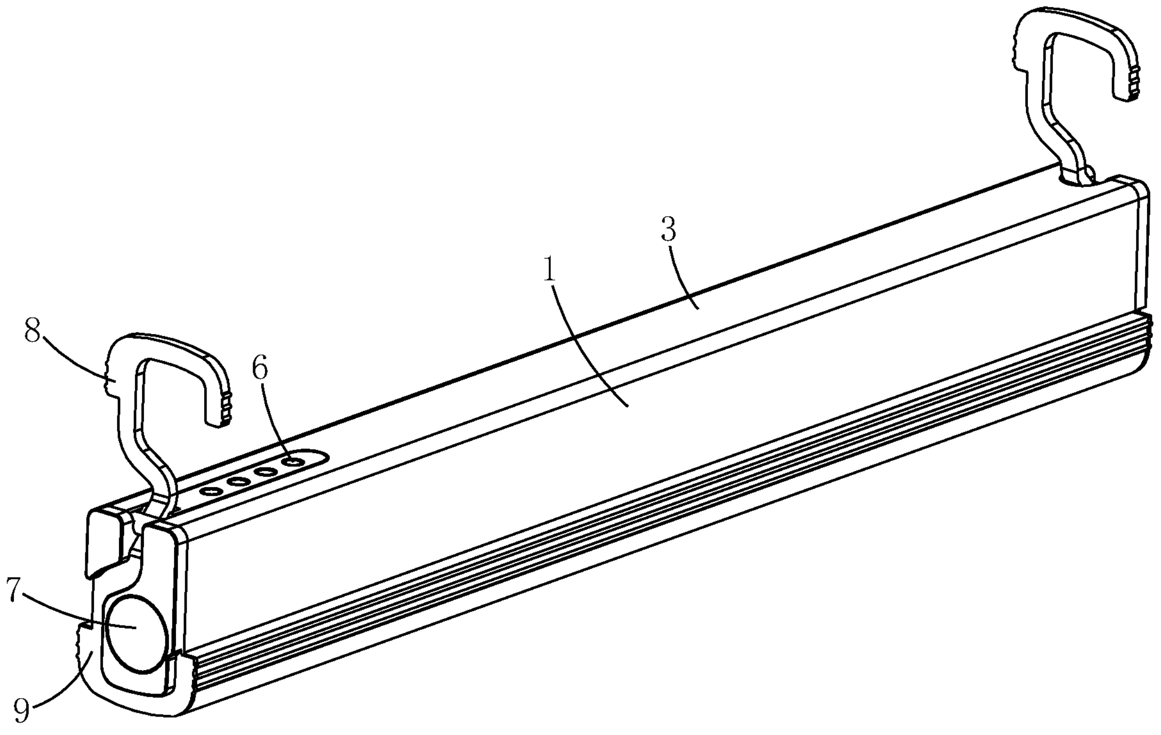
FIG. 1 illustrates a lighting apparatus embodiment.

Please refer to FIG. 1. In FIG. 1, a lighting apparatus embodiment has a top cover 3. In addition to the top cover 3, the elongated housing 1 has a connector 6 for connecting to other lighting apparatuses.

There is a switch 7 placed in an escaping groove 9. The hook 8 is used for hanging the lighting apparatus on a bracket.

Figure 2:
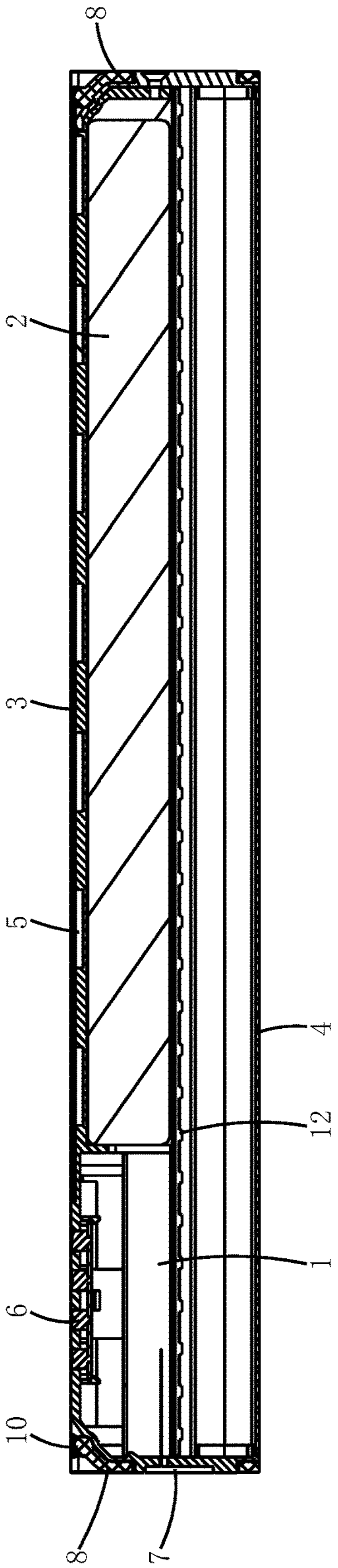
FIG. 2 illustrates a side view of an embodiment.

Please refer to FIG. 2, which illustrates a side view of the example in FIG. 1. The same reference numerals among drawings refer to the same components and are not repeated for brevity.

In FIG. 2, the light source 12 emits light passing through a light passing cover 4. The hinge axial 10 is used for attaching the hook 8. The switch 7 is used for operating the lighting apparatus.

There is a magnetic unit 5 for attaching an inserted extension module. A battery 2 may be added for emergency lighting.

Figure 3:
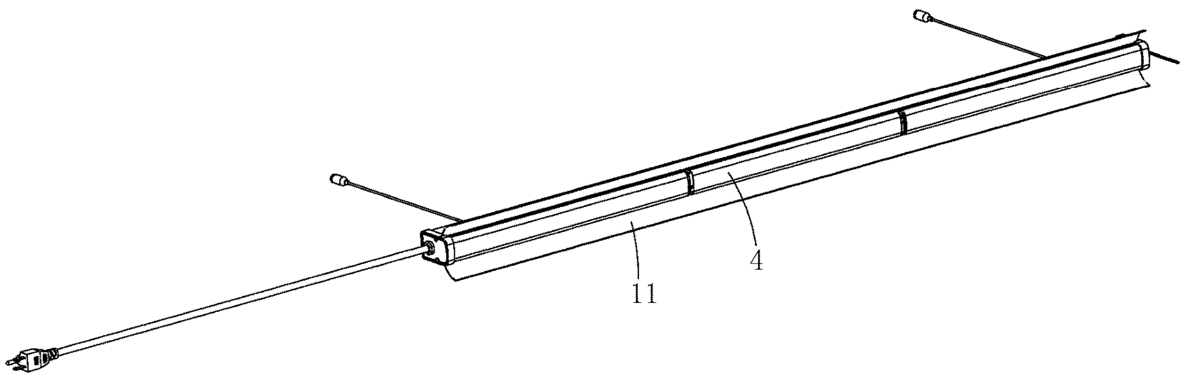
FIG. 3 illustrates a perspective view of an embodiment.

FIG. 3 shows another view of the example in FIG. 2 and FIG. 1.

Figure 4:
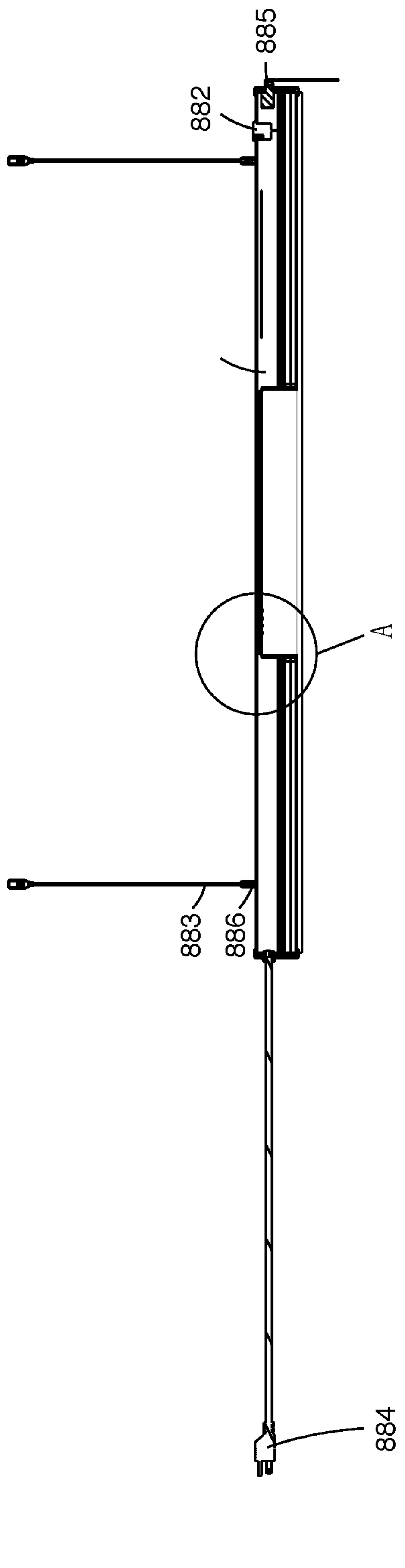
FIG. 4 illustrates a side view of an embodiment of a lighting apparatus.

FIG. 4 shows the same example with more details. A hanging wire 883 has a connecting column 886 is attached to the top cover. The switch 885 is used for operating the lighting apparatus, e.g. to change a color temperature or to turn on the lighting apparatus.

There is a socket 882 for connecting to another lighting apparatus.

The plug 884 of a power wire is connected to a power socket for getting external power.

Figure 5:
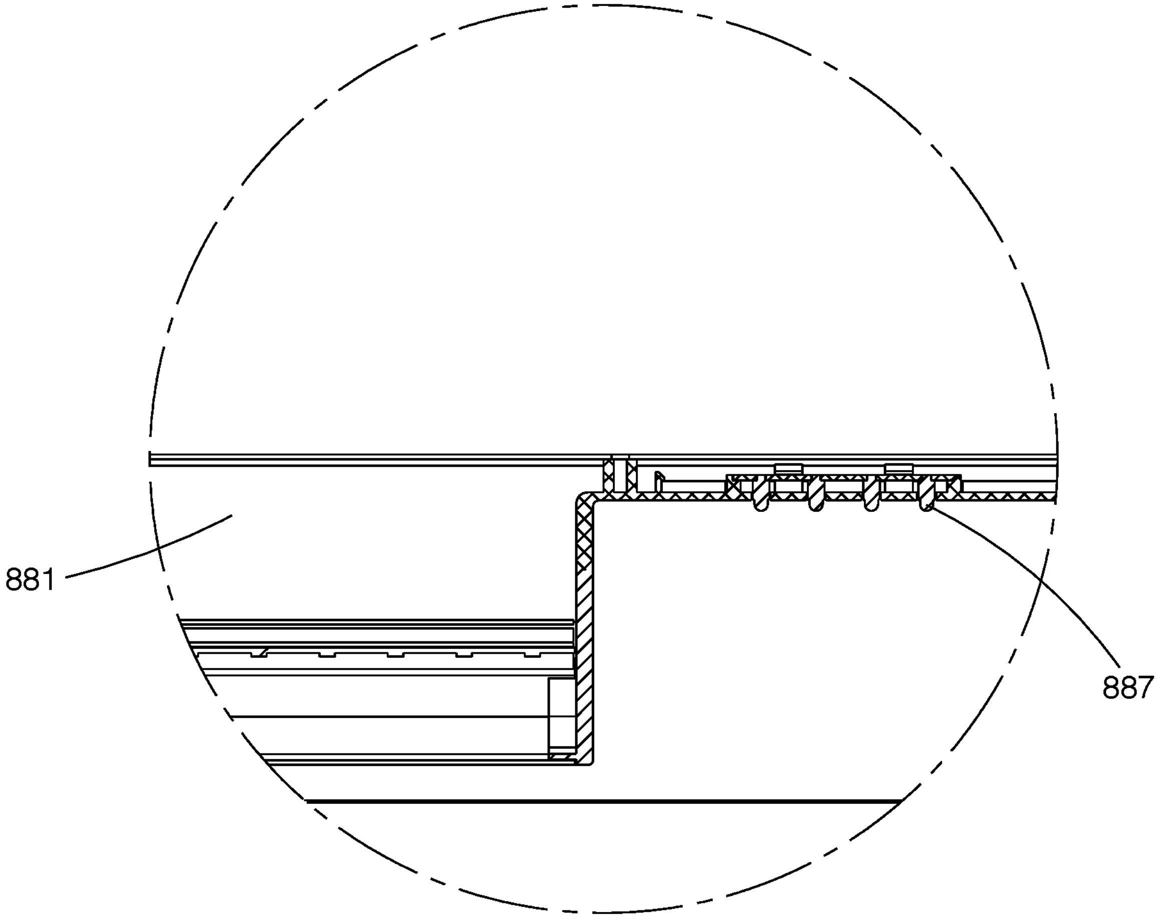
FIG. 5 illustrates a zoom-up view of a extending connector.

FIG. 5 shows a zoom-up view of an electrode which is an elastic metal pin 887 disposed in the light housing 881 for providing electricity to an inserted extension module.

Figure 6:
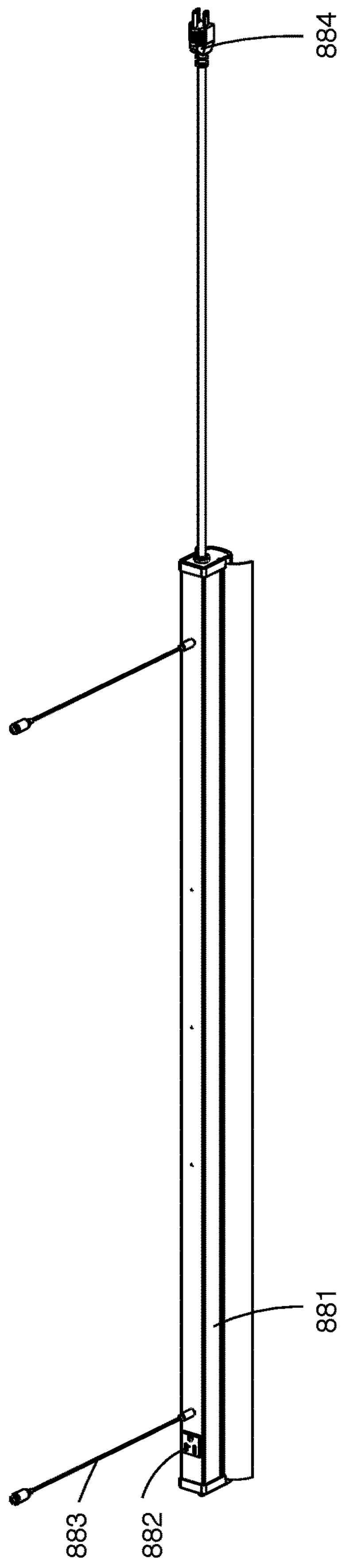
FIG. 6 illustrates a top view of an embodiment.

FIG. 6 shows another view of the example in FIG. 5.

Figure 7:
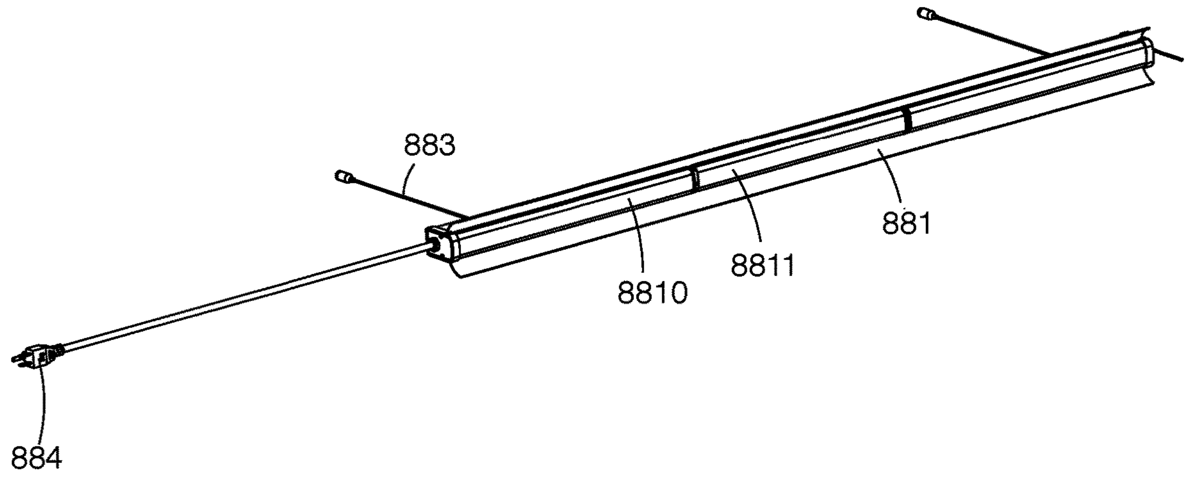
FIG. 7 illustrates another view of an embodiment.

FIG. 7 shows the example with further details like illustrating a light module 8810 and a spot light module 8811.

Figure 8:
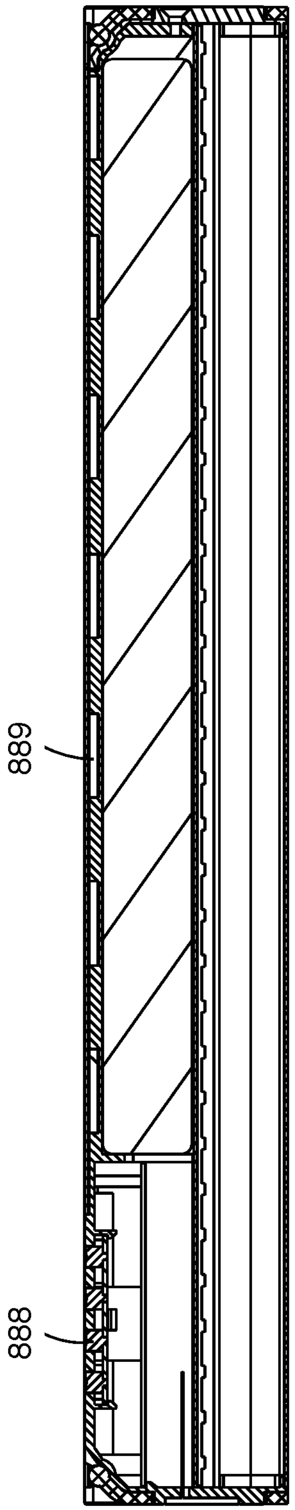
FIG. 8 illustrates a magnetic connector example.

FIG. 8 shows a connector 888 and a magnetic unit 889 for connecting other devices, like another lighting apparatus or an extension module.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings.

The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

The invention claimed is:

1. A lighting apparatus, comprising:
- a driver for converting an external power source to a driving current;
- an elongated housing with a lighting area, an extension area and a light opening;
- an extending connector with a holder and an electrode connecting to the driver, wherein the holder is placed in the extending area of the elongated housing;
- a light source attached to the lighting area for generating a first light escaping from the light opening; and
- an extension module attached to the holder of the extending connector to electrically connect to the driver via the electrode, wherein a pulling string is selectively attached to a string connector connected to a string switch of the driver to control the light source by pulling the pulling string, wherein a button is disposed at an end of the pulling string, the button is operated to send an instruction to the driver in addition to the pulling of the pulling string.

2. The lighting apparatus of claim 1, wherein the extension module is detachable to be replaced with another extension module.

3. The lighting apparatus of claim 2, wherein the holder has a sliding track for inserting the extension module from the light opening.

4. The lighting apparatus of claim 1, wherein the elongated housing has two lateral covers disposed on opposite sides of the elongated housing, a power wire is connected to one of the lateral covers for transmitting the external power to the driver.

5. The lighting apparatus of claim 1, wherein the elongated housing has two lateral covers disposed on opposite sides of the elongated housing, a light device connector is disposed on one of the lateral covers to connect to another lighting apparatus for routing electricity to said another lighting apparatus.

6. The lighting apparatus of claim 1, further comprising a rotation button and a manual switch, wherein the rotation button and the manual switch are electrically connected to the driver, the rotation button is used for perform a continuous operation for setting a continuous parameter continuously to operate the driver, the manual switch provides multiple discrete options for a user to select one of the multiple discrete options to operate the driver.

7. The lighting apparatus of claim 1, wherein the lighting apparatus is connected to a series of other lighting apparatuses, the lighting apparatus and the series of other lighting apparatuses are configured to receive a wall switch command to adjust a color temperature at the same time.

8. The lighting apparatus of claim 1, wherein the lighting apparatus is connected to another lighting apparatus, the light source of the lighting apparatus has a first type of light modules and a second type of light modules, said another lighting apparatus has the first type of light modules and the second type of light modules, the first type of light modules and the second type of the light modules of the lighting apparatus and said another lighting apparatus are alternatively turned on periodically to keep a portion of the first type of light modules and the second type of light modules of the lighting apparatus and said another lighting apparatus to rest to control an operation temperature of the lighting apparatus.

9. The lighting apparatus of claim 1, wherein the light source comprises a first light part and a second light part, the first light part and the second light part are disposed on two opposite sides of the extension module.

10. The lighting apparatus of claim 1, wherein the extension module comprises an air filter by guiding an air through a filter of the extension module.

11. The lighting apparatus of claim 1, wherein the extension module comprises an ultra-violet light module for sanitizing.

12. The lighting apparatus of claim 11, wherein the extension module has a motion sensor to turn off the ultra-violet light module when a person is detected.

13. The lighting apparatus of claim 11, wherein the extension module receives a timer command to turn on the ultra-violet light module after a predetermined time period.

14. The lighting apparatus of claim 11, further comprising a fan for creating an air flowing by the ultra-violet light module.

15. The lighting apparatus of claim 1, wherein the extension module is a speaker for generating a sound.

16. The lighting apparatus of claim 1, wherein the light source is detachable from the elongated housing.

17. The lighting apparatus of claim 1, wherein the extension module is a spot light module for emitting a second light, the second light is surrounded by the first light, the second light has a larger intensity than the first light.

18. The lighting apparatus of claim 17, wherein the driver sends a status signal to an external device when the driver detects insertion of the spot light module to change a control interface for controlling the lighting apparatus via a wireless interface.

* * * * *